(12) United States Patent
Lee et al.

(10) Patent No.: US 12,381,383 B2
(45) Date of Patent: Aug. 5, 2025

(54) DIFFERENT TYPE POWER CABLE CORE CONNECTION DEVICE AND DIFFERENT TYPE POWER CABLE CONNECTION SYSTEM COMPRISING SAME

(71) Applicant: LS CABLE & SYSTEM LTD., Anyang-si (KR)

(72) Inventors: Tae Ho Lee, Gumi-si (KR); Jin Wook Choe, Donghae-si (KR); Woong Yup Lee, Chungcheongnam-do (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 99 days.

(21) Appl. No.: 18/270,775

(22) PCT Filed: Dec. 31, 2021

(86) PCT No.: PCT/KR2021/020371
§ 371 (c)(1),
(2) Date: Jul. 3, 2023

(87) PCT Pub. No.: WO2022/149803
PCT Pub. Date: Jul. 14, 2022

(65) Prior Publication Data
US 2024/0055849 A1 Feb. 15, 2024

(30) Foreign Application Priority Data

Jan. 5, 2021 (KR) .................. 10-2021-0000613
Dec. 29, 2021 (KR) .................. 10-2021-0190686

(51) Int. Cl.
*H02G 15/18* (2006.01)
*H01B 7/02* (2006.01)
*H01R 4/70* (2006.01)
*H02G 15/115* (2006.01)

(52) U.S. Cl.
CPC ................... *H02G 15/18* (2013.01)

(58) Field of Classification Search
CPC . H01B 7/02; H01R 4/02; H01R 4/625; H01R 4/62; H02G 15/18
See application file for complete search history.

(56) References Cited

U.S. PATENT DOCUMENTS

| | | | | |
|---|---|---|---|---|
| 4,935,583 A | * | 6/1990 | Kyle | A61N 1/3754 174/152 GM |
| 2013/0130529 A1 | * | 5/2013 | Ayers | H01R 13/521 439/271 |
| 2017/0350198 A1 | | 12/2017 | Ma et al. | |

FOREIGN PATENT DOCUMENTS

| | | | |
|---|---|---|---|
| EP | 0770280 B1 | | 3/1999 |
| JP | 2007287668 A | | 11/2007 |
| KR | 20120004111 A | | 1/2012 |
| KR | 101128106 B1 | * | 3/2012 |

(Continued)

*Primary Examiner* — Timothy J Thompson
*Assistant Examiner* — Amol H Patel
(74) *Attorney, Agent, or Firm* — K&L Gates LLP

(57) ABSTRACT

The present disclosure relates to a different type power cable core connection device for minimizing the volume of a connection device for connection of different type power cables and minimizing cracking of an insulation molding part having a connection conductor embedded therein when current is conducted to conductors of cores of the different type power cables, and a different type power cable connection system including the same.

20 Claims, 10 Drawing Sheets

(56) References Cited

FOREIGN PATENT DOCUMENTS

KR   20200069969 A    6/2020
WO   WO-2020116721 A1 *  6/2020   ............. H01B 1/023

* cited by examiner

DIFFERENT TYPE POWER CABLE CORE CONNECTION DEVICE AND DIFFERENT TYPE POWER CABLE CONNECTION SYSTEM COMPRISING SAME

CROSS-REFERENCE TO RELATED APPLICATIONS

The present application is a National Stage of International Application No. PCT/KR2021/020371 filed on Dec. 31, 2021, which claims the benefit of Korean Patent Application No. 10-2021-0000613, filed on Jan. 5, 2021, and Korean Patent Application No. 10-2021-0190686, filed on Dec. 29, 2021 with the Korean Intellectual Property Office, the entire contents of which are hereby incorporated by reference.

FIELD

The present disclosure relates to a different type power cable core connection device and a different type power cable core connection system including the same. More particularly, the present disclosure relates to a different type power cable core connection device for minimizing the volume of a connection device for connection of different type power cables and minimizing cracking of an insulation molding part having a connection conductor embedded therein when current is conducted to conductors of cores of the different type power cables, and a different type power cable connection system including the same.

BACKGROUND

Power cables may include an insulating layer outside a conductor, and be divided into a paper-insulated power cable including a paper insulating layer (an oil-filled (OF) cable, a high-pressure oil-filled (POF) cable, or a mineral-insulated (MI) cable) and an XLPE insulated power cable according to the type of an insulating layer.

Power cables should be connected through a joint box at predetermined intervals. An intermediate connection of cables including the same type of insulating layers is performed by applying dedicated joint boxes thereof.

A connection structure, for a paper-insulated power cable and an XLPE insulated power cable, has a structure in which a reinforcing insulating layer formed by winding insulating paper and a sleeve member formed of a material, e.g., rubber, in the form of an insulation molding or pre-molded joint (PMJ) to surround a connection conductor are mounted with respect to a boundary region to reinforce insulation performance.

However, for intermediate connection of the paper-insulated power cable and the XLPE insulated power cable, a side of the connection structure is configured as a high-pressure oil filled environment with respect to a sleeve conductor, for connection of conductors of these power cables, as a boundary.

Therefore, in an intermediate connection device for intermediate connection of the paper-insulated power cable and the XLPE insulated power cable, a paper-insulated power cable region and an XLPE insulated power cable region should be spatially separated from each other.

FIG. 1 illustrates a different type power cable connection device 1000' for connecting a paper-insulated power cable 100A including a high-pressure fluid-filled (HPFF) pipe type 3-phase core 100a and an XLPE insulated power cable 100B including a 3-phase core 100b.

For intermediate connection of the HPFF pipe type 3-phase paper-insulated power cable 100A and the pipe type 3-phase XLPE insulated power cable 100B, in an intermediate connection structure, a paper-insulated power cable region A accommodates a high-pressure fluid and includes a housing with a diameter larger than a pipe, and a flange member 500 with a connection conductor is inserted into a boundary region, unlike an XLPE insulated power cable region B.

In addition, reinforcing insulating layers 140a and pre-molded joints (PMJs) 140b may be included in each phases of cores in housings 200a and 200b forming these cable regions.

A diameter of the different type power cable connection device 1000' with the housings 200a and 200b is larger than a high-pressure pipe and the inside thereof is filled with high-pressure insulating oil, and therefore, a connection system becomes bulky and heavy and thus is not easy to be connected to and installed in a conduit line inside a manhole.

In order to solve this problem, a method of separating the different type power cable core connection devices in each phases of cores may be considered, but in the case of an ultra-high-voltage power cable of 220 KV or higher, even when a connection system is divided in each phases of cores, the size of a PMJ for insulating an XLPE power cable connecting part increases in connection devices for the phases and thus the connection system is not easy to be connected to or installed in a conduit line under the ground.

Therefore, a different type power cable core connection device may be divided in each phases of cores and an insulated connection sleeve including a connection conductor and an insulating molding part may be considered as an insulating means for insulating the XLPE power cable connecting part, but the insulating molding part is likely to crack due to thermal contraction/expansion of the insulating molding part or the difference in coefficient of thermal expansion between the connection conductor and the insulating molding part and thus the durability of the insulated connection sleeve may be low.

SUMMARY

The present disclosure is directed to providing a different type power cable core connection device for minimizing the volume of a connection device for connection of different type power cables and minimizing cracking of an insulation molding part having a connection conductor therein when current is conducted to conductors of cores of the different type power cables, and a different type power cable connection system including the same.

To achieve these objects, the present disclosure provides a different type power cable core connection device for connecting a paper-insulated power cable core and an XLPE power cable core, comprising an insulated connection sleeve including a connection conductor and an insulation molding part surrounding an outer circumference of the connection conductor, wherein a conductor of the paper-insulated power cable core is connected to one end of the connection conductor and a conductor of the XLPE power cable core is connected to the other end of the connection conductor, wherein the connection conductor comprises a constant diameter portion, an expanded diameter portion having an increased outer diameter of the constant diameter portion, and a recessed portion into which the conductor of the XLPE power cable core is inserted, and a slope at a point on an outer circumferential surface of the insulation molding part surrounding the expanded diameter portion in a longitudinal direction is a value between a minimum slope and a maximum slope of an outer circumferential surface of the expanded diameter portion.

And the insulation molding part may comprise an inclined portion surrounding the expanded diameter portion, and a slope of an outer circumferential surface of the inclined portion in the longitudinal direction may range from 10 to 30 degrees.

And the slope of the outer circumferential surface of the inclined portion in the longitudinal direction may be constant.

And the insulation molding part may comprise a plurality of inclined portions with different slopes, and at least some of the plurality of inclined portions may be spaced apart from each other.

And the insulation molding part may comprise two consecutive inclined portions in a direction from one end of the connection conductor to the other end thereof, a non-inclined horizontal portion behind the two consecutive inclined portions, and another inclined portion behind the horizontal portion.

And the plurality of inclined portions may be provided in the direction from one end of the connection conductor to the other end thereof, and a non-inclined horizontal portion may be provided between the plurality of inclined portions.

And three inclined portions may be provided in the direction from one end of the connection conductor of the insulated connection sleeve to the other end thereof, and a non-inclined horizontal portion may be provided between the three inclined portions.

And the different type power cable core connection device may further comprise a reinforcing insulating layer surrounding a portion of an insulating layer of the paper-insulated power cable core, an outer side of the connection conductor to which the conductor of the paper-insulated power cable core may be connected, and at least a portion of the insulation molding part, wherein the reinforcing insulating layer may overlap only two inclined portions of the insulation molding part ahead of the horizontal portion.

And the connection conductor may comprise: a first conductor part with a connection hole to which a conductor of the paper-insulated power cable core is connected; and a second conductor part bonded with the first conductor part and including the constant diameter portion, the recessed portion, and the expanded diameter portion.

And the insulation molding part may surround an outer circumferential surface of the second conductor part, and the second conductor part may be formed of the same material as a conductor having a coefficient of thermal expansion relatively close to a coefficient of thermal expansion of the insulation molding part among the conductor of the paper-insulated power cable core and the conductor of the XLPE power cable core.

And the different type power cable core connection device may further comprise: a reinforcing insulating layer formed by winding insulating paper around a portion of an insulation layer of the paper-insulated power cable core, an outer side of the first conductor part, and at least a portion of the insulation molding part; and a stress relief cone mounted between the inside of the rear of the insulated connection sleeve and an outer circumferential surface of the XLPE power cable core.

And a thickness of the insulation molding part at an arbitrary point on the expanded diameter portion may be in a range of 40% or more and 130% or less of a radius of the second conductor part.

And the different type power cable core connection device may further comprise an elastic support unit mounted behind the stress relief cone to elastically support the stress relief cone in a direction toward the insulated connecting sleeve.

And the different type power cable core connection device may further comprise a conductor adapter mounted to surround an end portion of a conductor of the XLPE power cable core and to be locked in the recessed portion of the insulated connecting sleeve, and at least one locking pin may be provided on an outer circumferential surface of the conductor adapter, and a locking groove may be provided on an inner circumferential surface of the recessed portion to cause the at least one locking pin to be stucked and fixed in the locking groove.

And the at least one locking pin may be mounted on the conductor adapter while being elastically supported.

And both the conductor of the XLPE power cable core and the conductor adapter may be formed of aluminum or copper.

And the different type power cable core connection device may further comprise a contact band formed of a metal and provided on an outer circumferential surface of the conductor adapter to increase contact between the outer circumferential surface of the conductor adapter and an inner circumferential surface of the recessed portion.

And the contact band may be formed of a silver-plated material or a galvanized material.

And to achieve these objects, the present disclosure provides a different type power cable core connection device for connecting a paper-insulated power cable core and an XLPE power cable core, comprising an insulated connection sleeve including a first conductor part with a connection hole, a second conductor part, and an insulation molding part surrounding an outer circumference of the second conductor part, wherein a conductor of the paper-insulated power cable core is connected to the connection hole, and a conductor of the XLPE power cable core is connected to the second conductor part, wherein the second conductor part comprises a constant diameter portion, an expanded diameter portion having an increased outer diameter of the constant diameter portion, and a recessed portion into which the conductor of the XLPE power cable core is inserted, and the second conductor part is formed of the same material as a conductor having a coefficient of thermal expansion relatively close to a coefficient of thermal expansion of the insulation molding part among the conductor of the paper-insulated power cable core and the conductor of the XLPE power cable core.

And to achieve these objects, the present disclosure provides a different type power cable core connection device for connecting a paper-insulated power cable core and an XLPE power cable core, comprising an insulated connection sleeve including a connection conductor and an insulation molding part surrounding an outer circumference of the connection conductor, wherein a conductor of the paper-insulated power cable core is connected to one end of the connection conductor and a conductor of the XLPE power cable core is connected to the other end thereof, wherein the connection conductor comprises a constant diameter portion, an expanded diameter portion having an increased outer diameter of the constant diameter portion, and a recessed portion into which the conductor of the XLPE power cable core is inserted, and a slope at a point on an outer circumferential surface of the insulation molding part in a longitudinal direction gradually increases to 30 degrees or less in a direction toward the other end of the connection conductor.

And to achieve these objects, the present disclosure provides a different type power cable core connection device for connecting a paper-insulated power cable core and an XLPE power cable core, comprising an insulated connection sleeve including a connection conductor and an insulation molding part surrounding an outer circumference of the connection conductor, wherein a conductor of the paper-insulated power cable core is connected to one end of the connection conductor and a conductor of the XLPE power cable core is connected to the other end thereof, wherein the connection conductor comprises a constant diameter portion, an expanded diameter portion having an increased outer diameter of the constant diameter portion, and a recessed portion into which the conductor of the XLPE power cable core is inserted, and a slope of a straight line connecting a start point and an end point of the insulation molding part surrounding the expanded diameter portion of the connection conductor in a longitudinal direction is a value between a minimum slope and a maximum slope of an outer circumferential surface of the expanded diameter portion.

And to achieve these objects, the present disclosure provides a different type cable connection system comprising: a main pipe accommodating a plurality of paper-insulated power cable cores therein and filled with insulation oil at high pressure; a plurality of branch pipes split from the main pipes and each accommodating one of the plurality of paper-insulated power cable cores therein; and a plurality of different type power cable core connection devices according to the embodiments described by the claims of the present disclosure, wherein each of the plurality of different type power cable core connection devices includes one end connected to the plurality of branch pipes and the other end connected to one of a plurality of XLPE power cable cores split from an XLPE power cable.

According to a different type power cable core connection device and a different type power cable connection system including the same, a core connection device for connecting different type power cables including a plurality of cores in each phases of cores can be applied to allow installation in a narrow space such as a manhole and improve workability.

According to the different type power cable core connection device and the different type power cable connection system according to the present disclosure, a pre-molded joint (PMJ) can be omitted in a core connection device for connecting cores in each phases of cores, thereby minimizing the volume of the core connection device.

In addition, according to the different type power cable core connection device and the different type power cable connection system including the same according to the present disclosure, cracking of an insulation molding part having a connection conductor therein can be prevented when current is conducted to conductors of cores of the different type power cables.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 2:
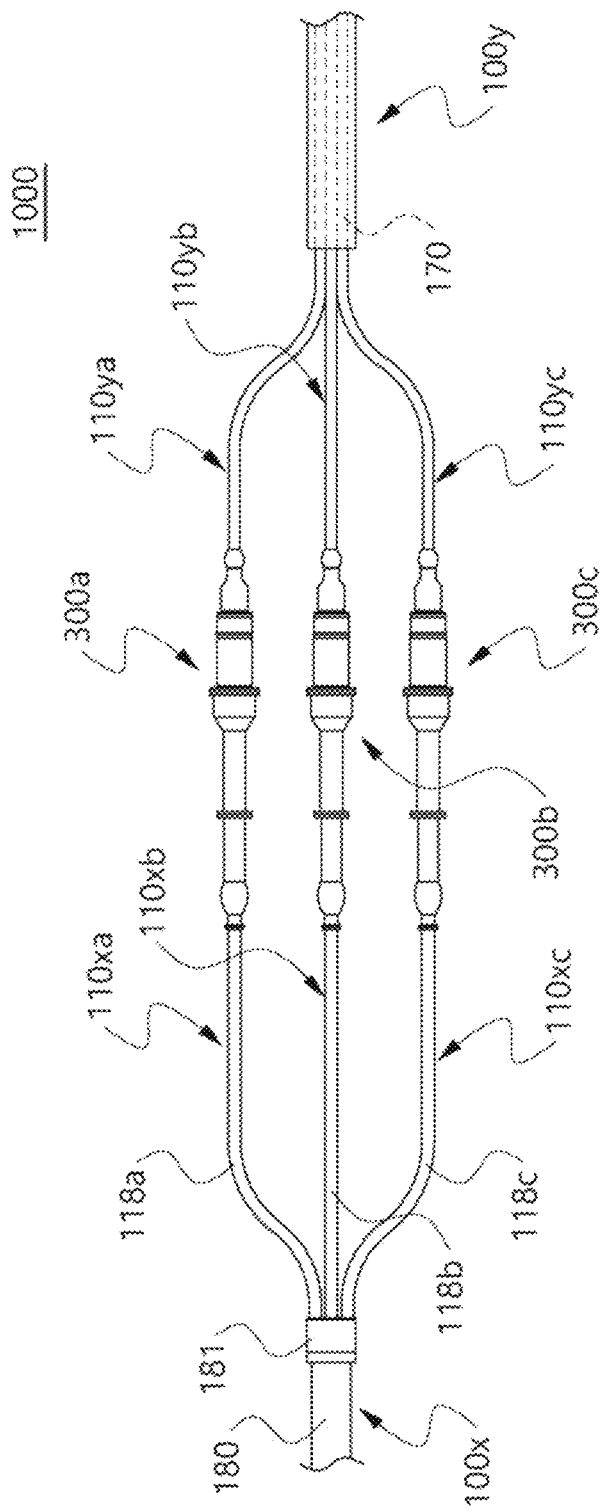
FIG. 2 illustrates a different type cable connection system according to the present disclosure.
Figure 3:
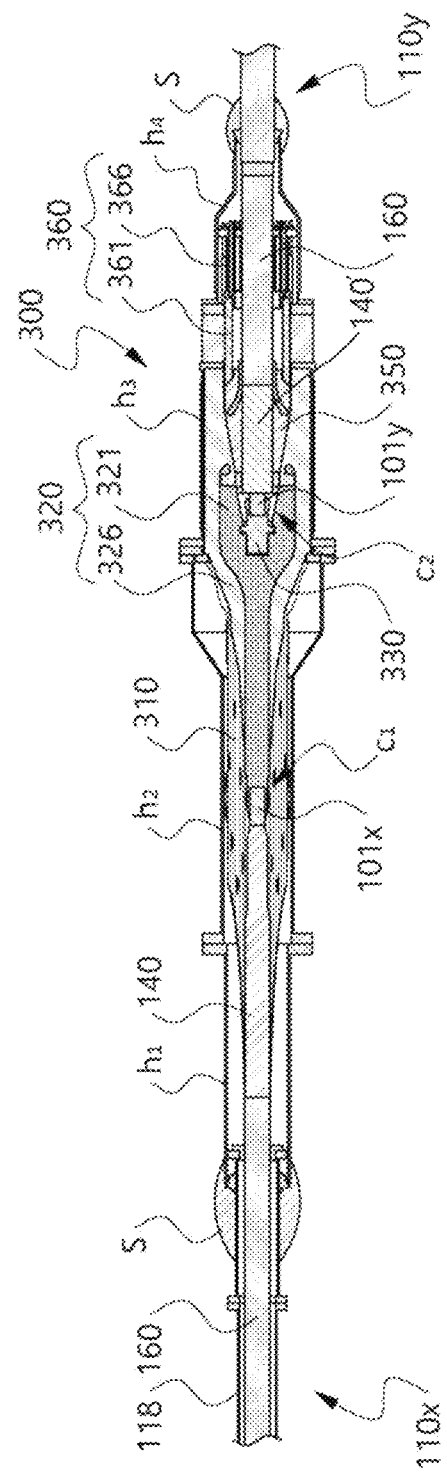
FIG. 3 is a cross-sectional view of a different type cable core connection device of the different type power cable connection system of FIG. 2 according to the present disclosure.

FIG. 2 shows a different type cable connection system 1000. FIG. 3 is a cross-sectional view of different type power cable core connection devices 300a, 300b, and 300c of the different type cable connection system 1000 according to the present disclosure of FIG. 2.

The different type cable connection system 1000 of the present disclosure may perform intermediate connection of a high-pressure fluid-filled (HPFF) pipe type 3-phase paper-insulated power cable (hereinafter referred to as a 'paper-insulated power cable') 100x and a 3-phase XLPE insulated power cable (hereinafter referred to as an 'XLPE power cable') 100y by using the different type power cable core connection devices 300a, 300b and 300c corresponding to the number of connecting parts of cable cores 110x and 110y to be connected rather than using one device.

As shown in FIG. 2, in the HPFF pipe type 3-phase paper-insulated power cable 100x, 3-phase paper-insulated cable cores 110xa, 110xb, and 110xc are accommodated while a high-pressure pipe 180 is filled with the high-pressure insulating oil; in the XLPE insulated power cable 100y to be connected, 3-phase XLPE cable cores 110ya, 110yb, and 110yc are accommodated in a cable jacket 170; and the cores of these cables may be connected in each phases of cores through the different type cable connection system 1000 of the present disclosure.

Therefore, in the HPFF pipe type 3-phase paper-insulated power cable 100x, the high-pressure pipe 180 is split into three branch pipes 118a, 118b, and 118c through a splitter 181, and each of the paper-insulated cable cores may be accommodated in one of the branch pipes 118a, 118b, and 118c.

The paper-insulated cable cores 110xa, 110xb, and 110xc accommodated in the branch pipes 118a, 118b, and 118c may be connected to the 3-phase XLPE cable cores 110*ya*, 110*yb*, and 110*yc* through the different type power cable core connection devices 300*a*, 300*b*, and 300*c*, respectively. In the 3-phase XLPE cable, the 3-phase XLPE cable cores 110*ya*, 110*yb*, and 110*yc* may be accommodated in the cable jacket 170, and thus, the cable jacket 170 should be removed and the XLPE cable cores 110*ya*, 110*yb*, and 110*yc* may be split to be connected to the different type power cable core connection devices 300*a*, 300*b*, and 300*c*.

The 3-phase different type power cable core connection device of the related art described above with reference to FIG. 1 is bulky and heavy and thus it is very difficult to secure a space for work and installation in a conduit line under the ground or a manhole, because a connecting part of each core is used as a connection device and a side of a boundary area is filled with the high-pressure insulating oil. In contrast, as shown in FIG. 2, even different type 3-phase power cables can be installed in a narrow space in a conduit line under the ground by connecting the power cables to each other by applying the different type power cable core connection devices 300 in each of the cores 110, and dividing and installing the different type power cable core connection devices 300 in each phases of cores in a conduit line.

Figure 1:
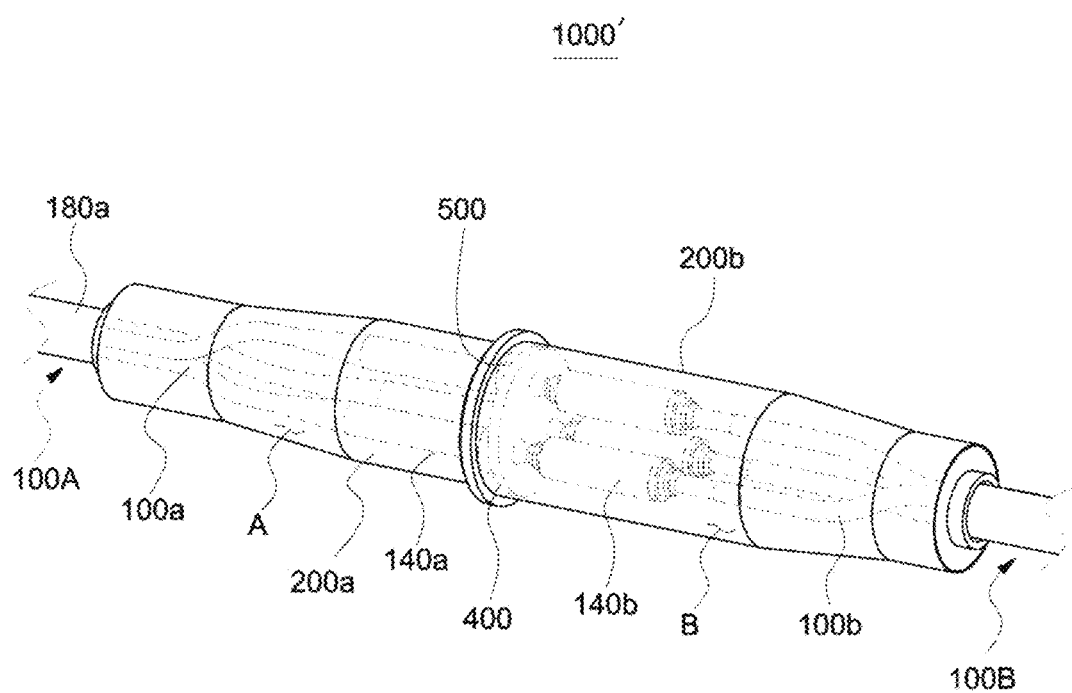
FIG. 1 illustrates a different type power cable connection device for intermediate connection of a high-pressure fluid-filled (HPFF) pipe type 3-phase paper-insulated power cable and a 3-phase XLPE insulated power cable.

An embodiment of the present disclosure includes a case in which a structure of an insulated connection sleeve illustrated in FIGS. 3 to 6 is applied while a connecting part of each core is configured as one connection device as in the 3-phase different type power cable core connection device of the related art shown in FIG. 1. That is, in an embodiment of the present disclosure, a structure for connecting cores of a paper-insulated power cable and an XLPE power cable is replaced with the insulated connection sleeve of FIGS. 3 to 6 while the housings 200*a* and 200*b* and the flange member 500 of FIG. 1 are used. For example, in an embodiment of the present disclosure, the structure of the paper-insulated power cable of FIG. 1 in which the housings 200*a* and 200*b*, which accommodate a high-pressure fluid therein and the diameter of which is greater than that of a pipe, and the flange member 500 including the connection conductor are inserted in a boundary area is employed, a PMJ structure is excluded in an XLPE power cable, and a connection structure of FIGS. 3 to 6 using an insulated connection sleeve for connecting the paper-insulated power cable and the XLPE power cable is employed to prevent an insulated connection sleeve from cracking.

As shown in FIG. 3, each of the different type power cable core connection devices 300*a*, 300*b*, and 300*c* may include: an insulated connection sleeve 320 including a connection conductor 321 having one end connected to a conductor of a paper-insulated power cable and the other end connected to a conductor of an XLPE power cable, and an insulation molding part 326 surrounding an outer circumference of the connection conductor 321; a reinforcing insulating layer 310 formed by surrounding, with insulating paper, a portion of an insulating layer 140 that insulates a conductor constituting a core of the paper-insulated power cable, the outside of the connection conductor 321 to which a conductor 101*x* of the core of the paper-insulated power cable is connected, and at least a portion of the insulated connection sleeve 320; a stress relief cone 350 mounted between an inner side of the rear of the insulated connection sleeve 320 and an outer circumference surface of the XLPE power cable; and an elastic support unit 360 mounted behind the stress relief cone 350 to elastically support the stress relief cone 350 in a direction toward the insulated connection sleeve 320.

The connection conductor 321 to which conductors 101*x* and 101*y* of the cable cores 110*x* and 110*y*, which are different type cable cores, may be embedded in the insulated connection sleeve 320.

The conductor 101*x* of the core 110*x* of the paper-insulated power cable may be connected to one end of the connection conductor 321, and the conductor 101*y* of the core 110*y* of the XLPE power cable may be connected to the other end of the connection conductor 321.

The insulated connection sleeve 320 may electrically connect the conductors 101*x* and 101*y* of the cores of the different type cables to each other, and at the same time partition an inner space of the housing of the different type cable connection device 300 into a space filled with the insulating oil and a region in which the stress relief cone 350 for relaxation of an electric field of a core of an XLPE power cable to be described below is installed.

A left region of FIG. 3 is a region of the housing filled with the insulating oil, and may communicate with a branch pipe 118 split from the high-pressure pipe 180 shown in FIG. 2.

The reinforcing insulating layer 310 may be provided by winding the insulating paper around an end of the connection conductor 321 of the insulated connection sleeve 320 and a conductor connection region C1 of the conductor of the core 110*x* of the paper-insulated power cable to reinforce the insulation performance of the connecting part, and an outer semiconducting restoration layer (not shown) may be provided by winding carbon paper around the outside of the reinforcing insulating layer 310, and connected to an outer semiconducting layer 160 of the core 110*x* of the paper-insulated power cable.

The reinforcing insulating layer 310 may be formed by winding the insulating paper around an insulating layer 140*x* of the core of the paper-insulated power cable, the conductor connection region C1 to which the conductor 101*x* of the core of the paper-insulated power cable and an end of the connection conductor 321 are connected, and at least a portion of the insulated connection sleeve 320, and an insulating layer of the core of the paper-insulated power cable may be expanded and reinforced in the same way.

The insulated connection sleeve 320 may include the connection conductor 321 and the insulation molding part 326.

The reinforcing insulating layer 310 may be formed by winding the insulating paper around at least a portion of the insulated connection sleeve 320 in a direction toward the other end of the connection conductor 321, such that as a thickness of the insulation molding part 326 of the insulated connection sleeve 320 increases, a thickness of the reinforcing insulating layer 310 decreases to achieve a flat outer circumferential surface of the reinforcing insulating layer 310 surrounding the insulation molding part 326 and the conductor connection region C1 as shown in FIG. 3.

The insulation molding part 326 may be formed of a material for insulating the connection conductor 321 while surrounding the outer circumference of the connection conductor 321. For example, the insulation molding part 326 may be formed of an epoxy resin.

The conductor 101*x* of the core 110*x* of the paper-insulated power cable may be connected to one end of the connection conductor 321, and the conductor 101*y* of the core 110*y* of the XLPE power cable may be connected to the other end of the connection conductor 321.

The connection conductor 321 may be embedded in the insulation molding part 326. As shown in FIG. 3, one end of the connection conductor 321 is exposed to the outside of the insulation molding part 326, and a thickness thereof increases gradually in a direction in which the housing of the connecting device is fastened, i.e., toward the other end thereof.

A diameter of the other end of the connection conductor 321 of the insulated connection sleeve 320 may be increased, and the conductor 101x of the core 110y of the XLPE power cable may be connected to the inside of the connection conductor 321.

A region of the connection conductor 321 of the insulated connection sleeve 320 that is embedded the insulation molding part 326 may be formed of an aluminum or copper material.

Preferably, the region of the connection conductor 321 that is embedded in the insulation molding part 326 may be formed of the same material as a conductor with a coefficient of thermal expansion relatively close to a coefficient of thermal expansion of the insulation molding part 326 among the conductor 101x of the core 110x of the paper-insulated power cable and the conductor 101y of the core 110y of the XLPE power cable.

For example, the region of the connection conductor 321 embedded in the insulation molding part 326 may be formed of an aluminum material having a small deviation in a coefficient of thermal expansion from the insulation molding part 326, and a conductor of a cable core to be connected may be formed of an aluminum or copper material. The coefficient of thermal expansion is a value representing a rate of change in the volume or length of a material due to a change in a temperature of the material, and includes a coefficient of cubical expansion and a coefficient of linear expansion. The coefficient of cubical expansion is a value obtained by converting an increase in a volume as temperature increases by 1° C. into a volume when temperature is 0° C., and the coefficient of linear expansion is a value obtained by converting an increase in a length as temperature increases by 1° C. into a length when temperature is 0° C. The coefficient of thermal expansion is an eigen value of a material, and when the coefficients of thermal expansion of adjacent materials are different from each other, a material that is lower in strength among the adjacent materials may crack due to a thermally expand deviation. Meanwhile, the coefficient of linear expansion of epoxy is in a range of 36 to $80*10^{-6}$ m/(m ° C.), the coefficient of linear expansion of aluminum is $23.8*10^{-6}$ m/(m ° C.), and the coefficient of linear expansion of copper is $17.1*10^{-6}$ m/(m ° C.) at a temperature of 0 to 100° C. Thus, it is possible to prevent cracking of the insulation molding part 326 that is low in strength when the region of the connection conductor 321 that is embedded in the insulation molding part 326 is formed of aluminum with the coefficient of linear expansion substantially the same as that of the insulation molding part 326.

Generally, a compression method may be used to connect the connection conductor 321 and the conductor 101x of the core 110x of the paper-insulated power cable, and an end of the connection conductor 321 may be formed differently according to the type of the conductor 101x of the core 110x of the paper-insulated power cable. For example, when the conductor 101x of the core 110x of the paper-insulated power cable is aluminum, the end of the connection conductor 321 may be formed of an aluminum material and formed integrally with the region of the connection conductor 321 embedded in the insulation molding part 326.

On the other hand, when the conductor 101x of the core 110x of the paper-insulated power cable is copper, the end of the connection conductor 321 may be formed of a copper material to prevent the oxidation of a metal surface that may occur when different type metals are compressed.

Figure 4:
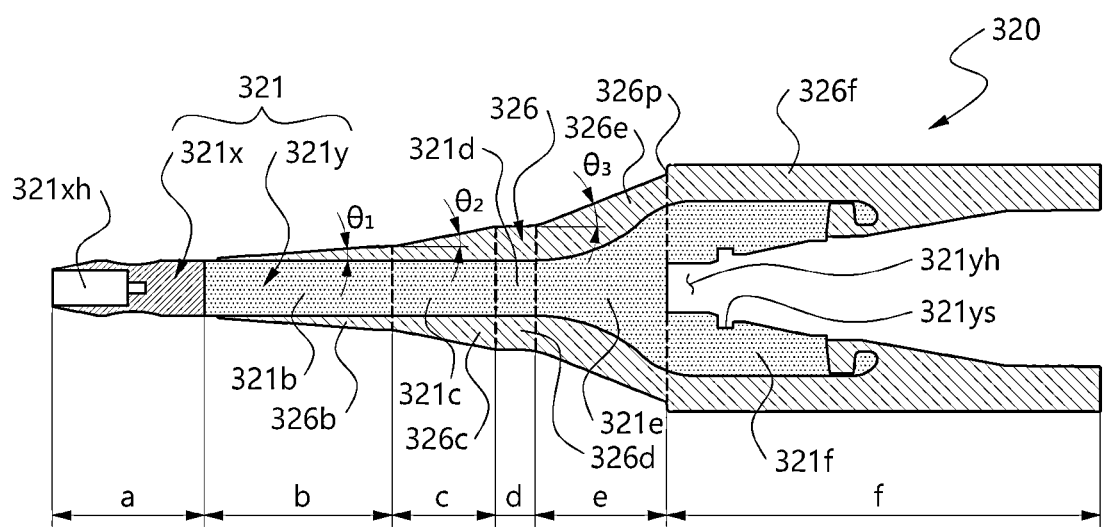
FIGS. 4 and 5 illustrate cross-sectional views of an insulated connection sleeve of a different type power cable core connection device of the present disclosure.
Figure 5:
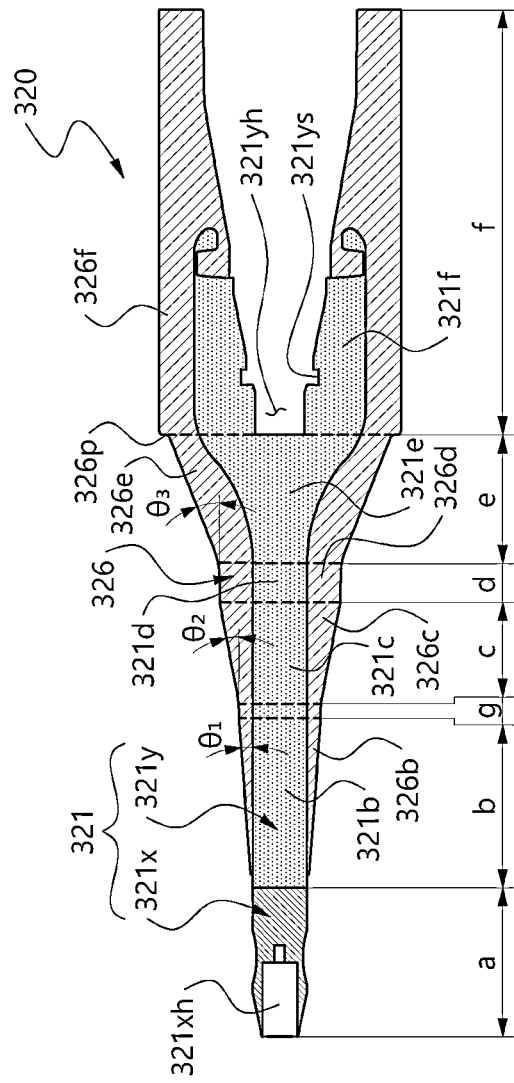

That is, in the embodiment shown in FIGS. 3 to 5 in which the conductor 101x of the core 110x of the paper-insulated power cable is copper, one end of the connection conductor 321 may be provided with a front connection hole, so that for connection of an insulated connection sleeve and a conductor of a cable, the conductor 101x of the core 110x of the paper-insulated cable may be inserted and compressed to form the first conductor connection region c1, and the connection conductor 321 may include a first conductor part 321x formed of copper. Behind the first conductor part 321x, a second conductor part 321y formed of aluminum may be bonded to the first conductor part 321x by welding or the like and thus the entire region of the connection conductor 321 that is embedded in the insulation molding part 326 may be formed of an aluminum material.

The conductor of the XLPE cable core 110y is connected to the other end of the connection conductor 321. A connection method such as compression cannot be used to connect the conductor 101y of the core 110y of the XLPE cable to a rear connection hole of the connection conductor 321, because the connection conductor 321 is embedded in the insulation molding part 326. The insulated connection sleeve and the XLPE cable may be connected by connecting a conductor adapter 330 including a separate fixing flange to the conductor 101y of the core 110y of the XLPE cable by a method such as compression, and pressing the conductor adapter 330 into an insertion groove, which includes a flange and is formed inside the rear connection hole of the connection conductor 321, to form a second conductor connection region c2.

The stress relief cone 350 may be mounted outside an XLPE insulating layer 140y exposed behind the conductor of the core 110y of the XLPE cable to relieve an electric field. The elastic support unit 360 may be provided behind the stress relief cone 350 to elastically support the stress relief cone 350 so that the stress relief cone 350 may be brought into close contact with the inside of the insulation molding part 326 of the insulated connection sleeve 320.

The elastic support unit 360 may include a pipe type propulsion member 361 to propel the rear of the stress relief cone 350, and an elastic member 366 that is in the form of springs may be provided behind the propulsion member 361.

Thus, when the elastic support unit 360 is mounted in a housing h of the different type power cable connection device, the elastic member 366 is compressed, thus elastically supporting the propulsion member 361, and therefore, the elastic propulsion of the stress relief cone 350 by the propulsion member 361 of the elastic support unit 360 may be maintained, thereby maintaining close contact between an inner circumferential surface of the insulation molding part 326 of the insulated connection sleeve 320 and an inner circumferential surface of the stress relief cone 350.

The different type power cable core connection device 300 according to the present disclosure may include the housing h into which the core 110x of the paper-insulated power cable and the core 110y of the XLPE power cable are introduced to be connected to each other, the housing h may be divided into a plurality of modular housings h1, h2, and h3, and a soldered part S may be provided for sealing on a boundary area of the core 110x of the paper-insulated power cable, the core 110y of the XLPE power cable, and the housing h for finishing of the cores 110x and 110y.

In addition, a connection region of the core 110x of the paper-insulated power cable, which is a part of an inner space of the housing h of the different type power cable core connection device 300, is filled with the high-pressure insulating oil and thus is separated from a connection region of the core 110y of the XLPE power cable.

As will be described with reference to FIG. 4 or 5 below, in the connection region of the core 110x of the paper-insulated power cable, which is filled with the high-pressure insulating oil, a thickness of the insulation molding part 326 of the insulated connection sleeve 320 gradually increases from the rear of the conductor connection region C1, and a stopping step 326P may be provided on a point at which the thickness is largest.

The stopping step 326p is a step structure configured to assemble or support the insulation molding part 326 and the housing, and is formed on a region of an maximum outer diameter of the insulation molding part 326.

The connection conductor 321 is embedded in the insulated connection sleeve 320, and the connection conductor 321 and the insulation molding part 326 expand and contract repeatedly due to heat generated when current is conducted. In the present disclosure, a conductor part of the connection conductor 321 of the insulated connection sleeve 320 embedded in the insulation molding part 326 is configured as a second conductor part 321y formed of aluminum to reduce a deviation in a thermal expansion rate from the insulation molding part 326.

Meanwhile, during the development of the different type power cable core connection device 300 of the present disclosure, it was confirmed that the insulation molding part 326 may crack according to a shape thereof due to the repetitive expansion and contraction of an aluminum conductor of the connection conductor 321 when heated and cooled.

A different type power cable core connection device according to the present disclosure, for connection of a core of a paper-insulated power cable and a core of an XLPE power cable, may include the insulated connection sleeve 320 including the connection conductor 321 having one end to which a conductor of the core of the paper-insulated power is connected and the other end to which a conductor of the core of the XLPE power cable is connected, and the insulation molding part 326 surrounding the outer circumference of the connection conductor 321. The connection conductor 321 may include a recessed portion into which the conductor of the core of the XLPE power cable is inserted, and an expanded diameter portion, the outer diameter of which increases near the recessed portion.

Furthermore, in the different type power cable core connection device according to the present disclosure, a slope at a point on an outer circumferential surface of the insulation molding part, which surround the expanded diameter portion, in a longitudinal direction may be a value between a minimum slope and a maximum slope of outer circumferential surface of the expanded diameter portion, as will be described in detail with reference to FIGS. 4 to 8 below.

As described above, the connection conductor 321 may be formed in multiple parts (when the conductor 101x is copper) or be integrally formed (when the conductor 101x is aluminum) according to a material of the conductor 101x of the core 110x of the paper-insulated power cable. An example in which the connection conductor 321 is formed in multiple parts when the conductor 101x of the core 110x of the paper-insulated power cable is copper will be described with reference to FIGS. 4 to 8 below.

Figure 6:
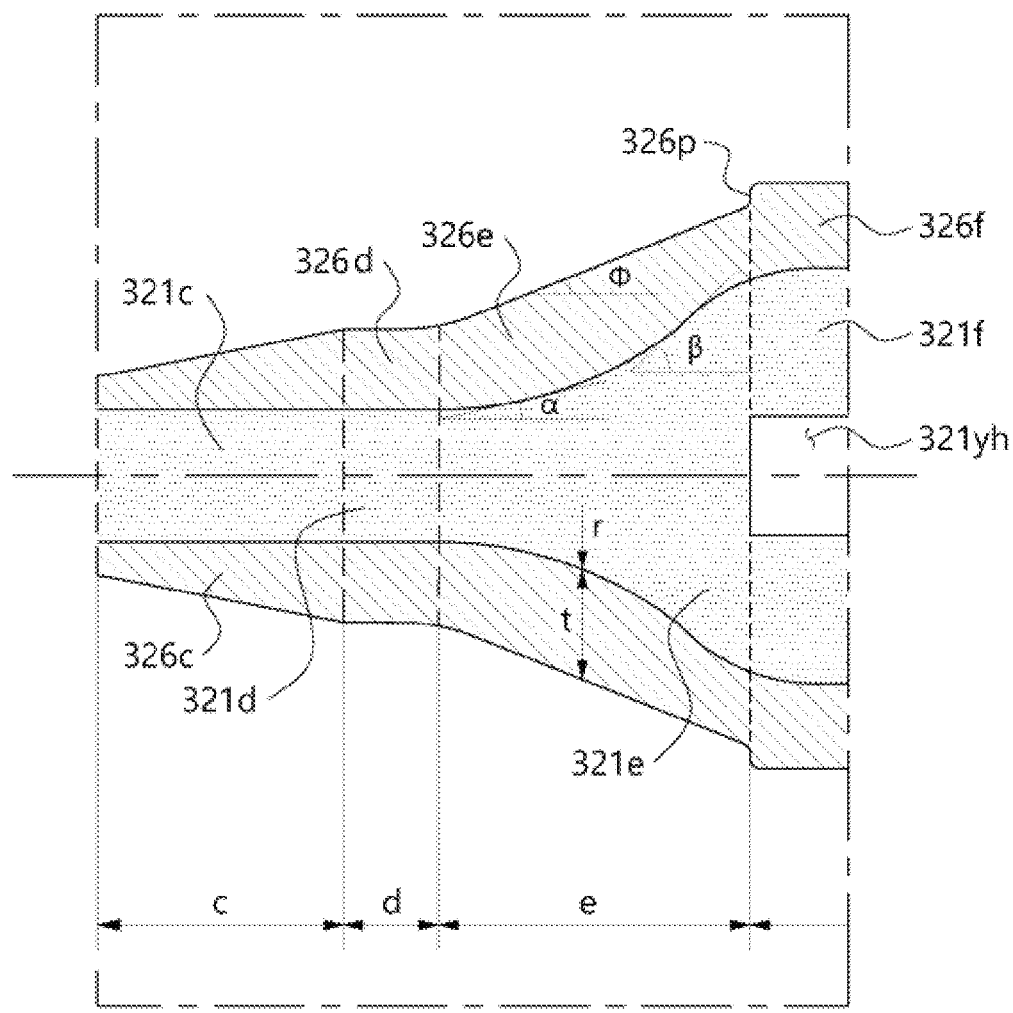
FIG. 6 is an enlarged view of an expanded diameter portion of a second conductor part of the insulated connection sleeve shown in FIGS. 4 and 5.
Figure 7:
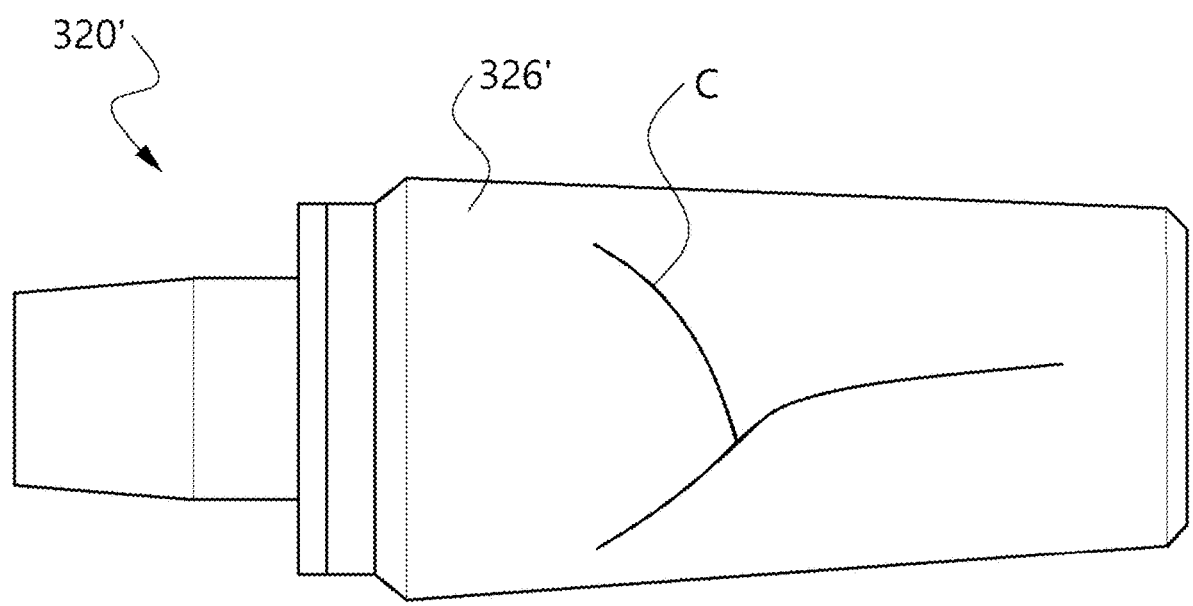
FIG. 7 is an image of an outer circumferential surface of an insulated connection sleeve of a different type power cable core connection device of the present disclosure according to an interim research result of a development process of the different type power cable core connection device.
Figure 8:
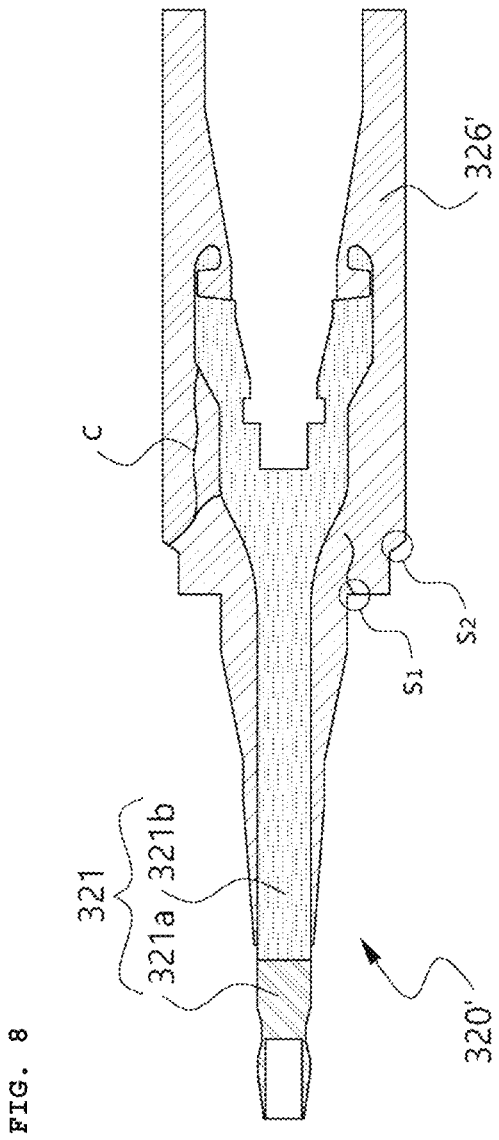
FIG. 8 is a cross-sectional view of the insulated connection sleeve of FIG. 7.

FIG. 4 is a cross-sectional view of an insulated connection sleeve of a different type power cable core connection device according to an embodiment of the present disclosure. FIG. 5 is a cross-sectional view of an insulated connection sleeve of a different type power cable core connection device according to another embodiment of the present disclosure. FIG. 6 is an enlarged view of an expanded diameter portion of a second conductor part of the insulated connection sleeve shown in FIGS. 4 and 5. FIG. 7 is an image of an outer circumferential surface of an insulation molding part 326' of an insulated connection sleeve 320' of a different type power cable core connection device of the present disclosure according to an interim research result of a development process of the different type power cable core connection device. FIG. 8 is a cross-sectional view of the insulated connection sleeve 320' of FIG. 7.

As shown in FIG. 4, the connection conductor 321 is embedded in the insulated connection sleeve 320 of the present disclosure, and the insulation molding part 326 is provided on the outside of the connection conductor 321.

A conductor of a core of a paper-insulated power cable is compressively inserted into one end (left end) of the connection conductor 321 of the insulated connection sleeve 320 of FIG. 4 to be connected to the connection conductor 321. For example, one end of the connection conductor 321 is configured as the first conductor part 321x formed of copper and including a connection hole 321xh into which the conductor 101x of the core 110x of the paper-insulated power cable is inserted, and the first conductor part 321x is bonded with the second conductor part 321y by welding or the like.

The other end of the connection conductor 321 configured as the second conductor part 321y may include a connection hole 321yh to which the conductor of the core 110y of the XLPE power cable is connected, and the insulation molding part 326 may have a shape surrounding the second conductor part 321y and having an outer diameter increasing in a backward direction, i.e., a direction toward the other end of the connection conductor 321.

Specifically, the second conductor part 321y may include a first constant diameter portion 321b and a second constant diameter portion 321c that are covered with the reinforcing insulating layer 310 (see FIG. 3) in a direction toward the connection hole 321yh and have a constant outer diameter, a third constant diameter portion 321d that is not covered with or is partially covered with the reinforcing insulating layer 310 and has a constant outer diameter, an expanded diameter portion 321e, the outer diameter of which increases, and a recessed portion 321f in which the connection hole 321yh is formed. Here, the expanded diameter portion 321e is a portion ranging from a point on the connection conductor 321 at which an outer diameter increases initially to a point on the connection conductor 321 at which the connection hole 321yh is formed, i.e., a portion of the connection conductor 321 located in a region e shown in FIG. 6. Here, the recessed portion 321f is a portion ranging from a point on the connection conductor 321 at which the connection hole 321yh is formed to the other end of the connection conductor 321, i.e., a portion of the connection conductor 321 located in a region f shown in FIG. 4.

Similarly, as the second conductor part 321y is divided into several parts, the insulation molding part 326 may include inclined portions and horizontal portions, i.e., a first inclined portion 326b outside the first constant diameter portion 321b, a second inclined portion 326c outside the second constant diameter portion 321c, a first horizontal portion 326d outside the third constant diameter portion 321d, a third horizontal portion 3263 outside the expanded diameter portion 321e, and a second horizontal portion 326f outside the recessed portion 321f.

As shown in FIG. 4, an insulation molding part of an insulated connection sleeve of a different type power cable core connection device of the present disclosure may include a plurality of inclined portions having outer circumferential surfaces of different slopes in the longitudinal direction, and at least some of the inclined portions may be spaced apart from each other with the horizontal portions interposed therebetween.

Here, a "slope" of the insulation molding part is an angle formed by a cross section of the insulation molding part in the longitudinal direction and a horizontal reference line.

The first horizontal portion 326d may be provided to separate the first and second inclined portions 326b and 326c covered with the reinforcing insulating layer 310 from the third inclined portion 326e, so that the first horizontal portion 326d and an outer circumferential surface of an end of the reinforcing insulating layer 310 may be connected flat to each other.

When a slope of the outer circumferential surface of the insulation molding part 326 changes suddenly to more than 45 degrees, a change in an electric field on the outer circumferential surface on which the reinforcing insulating layer 310 is formed may also change suddenly, thus reducing the stability of the electric field. Thus, slopes of the outer circumferential surfaces of the inclined portions of the insulation molding part 326 in the longitudinal direction may be set to 45 degrees or less, and it was experimentally confirmed that the slopes are preferably 30 degrees or less to prevent a sudden change in an electric field on the outer circumferential surface of the insulation molding part 326 and prevent the occurrence of cracks at boundaries between the horizontal portions and the inclined portions. As shown in FIG. 4, in the present disclosure, in order to prevent cracking of the insulation molding part 326 due to the expansion of conductors when current is conducted to the connection conductor 321, the insulation molding part 326 of each of the different type cable core connection devices 300a, 300b, and 300c may be configured such that an outer diameter increases to a predetermined value in the direction of the other end of the connection conductor 321 and the insulation molding part 326 includes a plurality of inclined portions in consideration of an increase in an outer diameter of the connection conductor in the insulation molding part 326. Slopes of the inclined portions may be different from each other, and horizontal portions may be interposed between the inclined portions.

In the embodiment of FIG. 4, three inclined portions may be formed consecutively or spaced apart to form a first angle θ1 to a third angle θ3, and all of the first angle θ1 to the third angle θ3 may be set to 45 degrees or less, and preferably, 30 degrees or less.

In summary, the outer diameter of the insulation molding part 326 increases to the predetermined value in the direction toward the other end of the connection conductor 321, each of the inclined portions may be divided into several parts according to the continuity of the slopes, and the slopes of the inclined portions may be set to less than 45 degrees.

In the embodiment of FIG. 4, in the present disclosure, the insulated connection sleeve 320 is divided into regions a, b, c, d, e, and f in a direction from one end to the other end. In the region a, a first conductor part 321x of the connection conductor 321 is not molded by the insulation molding part 326. In the region b, a first constant diameter portion 321b that is the start of the second conductor part 321y bonded with the first conductor part 321x is provided, and an outer side thereof is covered with the first inclined portion 326b of the insulation molding part 326 with a slope of the first angle θ1. The region c is consecutive to the region b, in which a second constant diameter portion 321c is provided and an outer side thereof is covered with the second inclined portion 326c of the insulation molding part 326 with a slope of the second angle θ2. The regions b and c overlap the reinforcing insulating layer 310 and the insulation molding part 326 described above.

The region d is consecutive to the region c, in which a third constant diameter portion 321d of the second conductor part 321y is covered in a uniform thickness with the first horizontal portion 326d of the insulation molding part 326 without a slope. The region e is consecutive to the region d, in which an expanded diameter portion 321e of the second conductor part 321y is covered with the third inclined portion 326e of the insulation molding part 326 with a slope of the third angle θ3. The stopping step 326p is provided on an end of the region 3, thus forming the outer diameter of the insulation molding part 326.

The expanded diameter portion 321e of the second conductor part 321y is a region that buffers a change in the diameters of the first to third constant diameter portions 321b, 321c, and 321d relative to the outer diameter of the recessed portion 321f.

The region f is consecutive to the region e, in which the recessed portion 321a including the connection hole 321yh of the second conductor part 321y therein is covered with the second horizontal portion 326f of the insulation molding part 326 with no slope. A stress relief cone is inserted into the rear of the recessed portion 321f to relief an electric field as described above.

Each of the outer circumferential surfaces of the first inclined portions 326b to the third inclined portion 326e of the insulation molding part in the longitudinal direction is shown as having a constant slope but may be gently curved. That is, these inclined portions may be a plurality of inclined portions each having a constant angle but may be curved portions whose slopes change continuously and an instantaneous slope of the outer circumferential surface of the insulation molding part may also be set to 45 degrees or less in this case.

An outer diameter of the insulation molding part 326 of the insulated connection sleeve 320 of the present disclosure may increase to a predetermined value in a direction toward the other end of the connection conductor 321, and slopes of the outer circumferential surfaces of the inclined portions of the insulation molding part in the longitudinal direction may be set to 45 degrees or less, and preferably, 30 degrees or less as described above.

The stopping step 326p whose diameter increases to 45 degrees or more to determine a location of a housing or support the housing is formed on an end of an outermost slope of the insulation molding part 326 of the insulated connection sleeve 320 to determine a location of the housing g formed of a metal to surround the reinforcing insulating layer 310, the insulated connection sleeve 320, the stress relief cone 350, and the elastic support unit 360 or support the housing h, as described above.

An insulated connection sleeve 320 of FIG. 5 further includes a second horizontal portion 326g between a first inclined portion 326b and a second inclined portion 326c, unlike the insulated connection sleeve shown in FIG. 4.

That is, as shown in FIG. 5 an insulation molding part that is a part of the insulated connection sleeve 320 and surrounds a connection conductor has a structure in which inclined portions are not consecutive to each other and a horizontal portion is interposed between the inclined portions.

Due to the length of the core connection device 300 (see FIG. 2) or the insulated connection sleeve 320 or a problem of a mold or a process, different inclined portions are not provided consecutively and a horizontal portion may be provided between the inclined portions. That is, when the horizontal portion is provided between the different inclined portions, a reinforcing insulating layer is easy to form, and when a total length and thickness of the insulated connection sleeve are first determined in terms of insulation strength design, a slope can be easily formed by forming the horizontal portion between the inclined portions rather than by providing the inclined portions without the horizontal portion.

As described above, the insulation molding part of the insulated connection sleeve may be configured as one inclined or curved surface but may include a plurality of inclined portions as shown in FIGS. 4 and 5. Some of the inclined portions may be consecutive. A horizontal portion may be interposed between all of the inclined portions. In both the embodiments of FIGS. 4 and 5, when three inclined portions are provided, only first and second inclined portions from the front may be surrounded by a reinforcing insulating layer.

Therefore, in the connection conductor 321 of the embodiment of FIG. 5, a fourth constant diameter portion 321g may further be partitioned between the first and second constant diameter portions 321b and 321c, and a second horizontal portion 326g may be further provided between the first and second inclined portions 326b and 326c outside the first and second constant diameter portions 321b and 321c. Other structures are the same as those of the embodiment described above with reference to FIG. 4 and thus a redundant description is omitted here.

In the insulation molding part 326 of the insulated connection sleeve 320, the third inclined portion 326e surrounding the expanded diameter portion 321e of the second conductor part 321y, the diameter of which increases to connect the recessed portion 321f including a connection hole therein and the constant diameter portions 321b, 321c, and 321d, is more likely to crack.

Therefore, it is desirable to precisely control a slope and thickness of the third inclined portion 326e in response to a change in the outer diameter of the expanded diameter portion of the second conductor part in the third inclined portion 326e.

According to the present disclosure, it was confirmed through a test or simulation under various conditions that cracking of the insulation molding part 326 minimized when a slope at an arbitrary point on the outer circumferential surface of the third inclined portion 326e surrounding the expanded diameter portion 321e was a value between a minimum slope and a maximum slope of the outer circumferential surface of the expanded diameter portion 321e of the second conductor part.

As shown in FIG. 6, a slope $\phi$ at an arbitrary point on the outer circumferential surface of the third inclined portion 326e is preferably a value between a minimum slope $\alpha$ and a maximum slope $\beta$ of the outer circumferential surface of the expanded diameter portion 321e of the second conductor part.

A slope $\phi$ at an arbitrary point on the outer circumferential surface of the third inclined portion 326e may satisfy a relation of $\alpha<\phi<\beta$ and be a value between 10 degrees and 30 degrees. The slope $\phi$ preferably satisfies the above range even when the outer circumferential surface of the third inclined portion 326e is a curved surface whose slope is not constant.

For insulation performance of the expanded diameter portion 321e, a method of sufficiently increasing a thickness of the third inclined portion 326e of the insulation molding part may be considered but is not desirable because costs, a size and weight of a different type power cable core connection device increase. It was experimentally confirmed that desired insulation performance was secured when a thickness t of the third inclined portion 326e of the insulation molding part at an arbitrary point on the expanded diameter portion 321e was 40% or more or 130% or less of a radius r of an aluminum conductor part, i.e., the expanded diameter portion 321e.

FIG. 7 is an image of an outer circumferential surface of an insulated connection sleeve 320' of a different type power cable core connection device of the present disclosure according to an interim research result of a development process of the different type power cable core connection device. FIG. 8 is a cross-sectional view of the insulated connection sleeve 320' of FIG. 7.

It was confirmed that in the insulated connection sleeve 320' of FIGS. 7 and 8, two steps s1 and s2 were formed on an insulated connection sleeve 326 due to a sudden change in an outer diameter in a direction toward the other end of a connection conductor and cracks occurred in a wide range at inner corners of the steps s1 and s2 of the insulation molding part 326 when a conduction test was performed repeatedly.

In general, edges of a solid are regions on which stress is concentrated due to external force, and a slope, thickness or the like of the solid are factors that determine whether stress is concentrated.

Therefore, the slopes of the two steps s1 and s2 are respectively about 90 degrees and about 50 degrees, and stress may be concentrated on the steps s1 and s2 due to the difference in expansion rate of the insulation molding part 326 when a conductor expands. Thus, it is estimated that such stress causes cracks.

Accordingly, when steps or the like are formed on the insulation molding part 326, it is desirable to minimize the height of the steps and prevent a sudden increase in slopes forming the steps.

As shown in FIG. 4, it was experimentally confirmed that cracking of the insulation molding part 326 due to heat generated when current is conducted to connection conductor 321 was prevented, when an outer diameter of the insulation molding part 326 increased, a slope of an inclined portion formed to increase the outer diameter was set to 45 degrees or less, the inclined portion was divided into a plurality of inclined portions if necessary, and the plurality of inclined portions were provided consecutively or spaced apart from each other.

In particular, it was confirmed that in the case of the third inclined portion 326e that is most likely to crack as a slope increases and thus is a weak point, damage such as cracks to the insulation molding part 326 due to heat generated when current is conducted to the connection conductor 321 was prevented when a slope $\phi$ at an arbitrary point on the outer circumferential surface of the third inclined portion 326e in the longitudinal direction was set to a value between a minimum slope $\alpha$ and a maximum slope $\beta$ of the outer circumferential surface of the expanded diameter portion 321e of the second conductor part.

Figure 9:
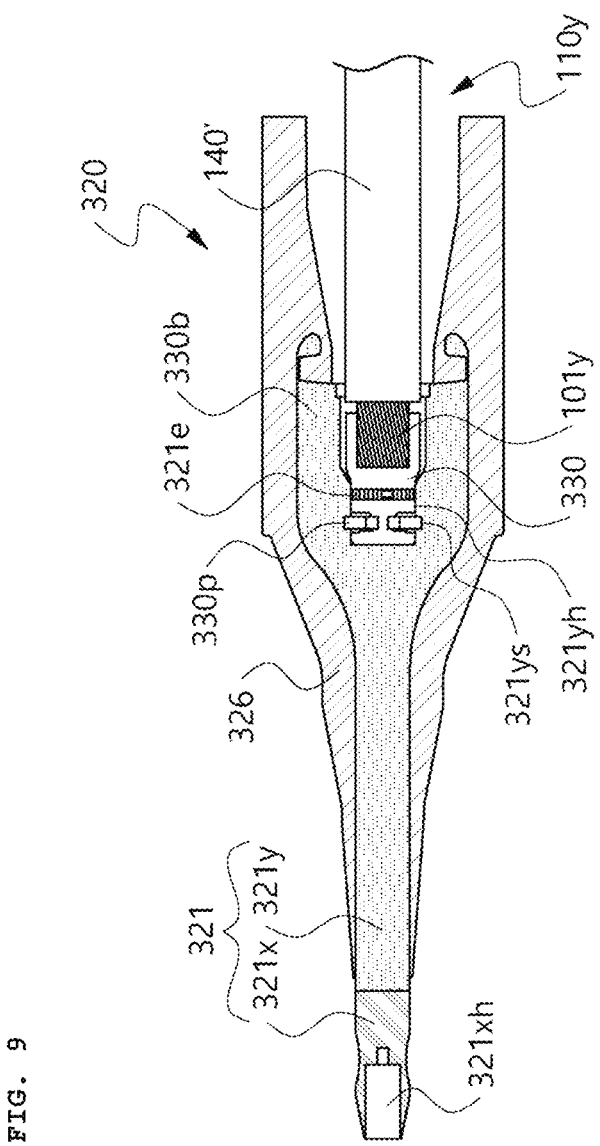
FIG. 9 is a cross-sectional view of the periphery of an interface between an insulated connection sleeve of a different type cable connection system according to the present disclosure and a conductor part of a core of an XLPE power cable.

FIG. 9 is a cross-sectional view of the periphery of an interface between an insulated connection sleeve of a different type power cable connection system according to the present disclosure and a conductor part of an XLPE power cable core.

Similarly, a different type power cable core connection device, for connection of a paper-insulated power cable core and an XLPE power cable core, may include an insulated connection sleeve 320 including a connection conductor 321 having one end connected to a conductor of the paper-insulated power cable core and the other end connected to a conductor 101y of the XLPE power cable core, and an insulation molding part 326 surrounding the connection conductor 321.

In the embodiment of FIG. 9, an end of the conductor 101y of the XLPE power cable core may be mounted in a recessed portion 321yh while being mounted on a conductor adapter 330, as in the embodiment of FIG. 3. In the embodiment of FIG. 3, a fixing flange is provided on an outer circumferential surface of the conductor adapter 330, whereas in the embodiment of FIG. 9, at least one locking pin 330p may be provided on an outer circumferential surface of the conductor adapter 330 and a locking groove 321ys may be provided in an inner circumferential surface of the recessed portion 321yh to cause the at least one locking pin 330p to be stuck and fixed in the locking groove 31ys.

That is, the fixing flange is integrally formed with the outer circumferential surface of the conductor adapter 330 of FIG. 3, but in the embodiment of FIG. 9, the at least one locking pin 330p is mounted on the outer circumferential surface of the conductor adapter 330 to minimize insertion resistance when mounting the conductor adapter 330 in the recessed portion 321yh and improve the reliability of the mounting of the conductor 101y of the XLPE power cable core and the conductor adapter 330 when the mounting of the conductor adapter 330 is completed.

At least one locking pin 330p and preferably two or more locking pins 330p may be mounted on the outer circumferential surface of the conductor adapter 330 in a circumferential direction.

To this end, mounting holes may be formed in the outer circumferential surface of the conductor adapter 330, and the at least one locking pin 330p may be mounted in the mounting holes while being elastically supported by an elastic member (not shown) such as a spring.

In addition, as in the above-described embodiment, a slope at an arbitrary point on the outer circumferential surface of the insulation molding part 326 in the longitudinal direction may set to gradually increase to 45 degrees or less toward the other end of the connection conductor 321.

As described above, a region of the connection conductor 321 of the insulated connection sleeve 320 embedded in the insulation molding part 326 may be formed of an aluminum material having a small deviation in a coefficient of thermal expansion from the insulation molding part 326.

In addition, both the conductor 101y of the XLPE power cable core and the conductor adapter 330 may be formed of aluminum.

When the conductor 101y of the XLPE power cable core is formed of copper, the conductor adapter 330 may also be formed of copper in consideration of compressibility and the like.

When the conductor adapter 330 is formed of aluminum or copper, a contact band 330b formed of a metal may be provided to surround the outer circumferential surface of the conductor 330 so as to increase a contact surface between the connection conductor 321 of the connection sleeve and the conductor adapter 330 or conductivity. The contact band 330b may be formed by punching or bending a strip type band to form multiple irregularities or bumps so as to improve the reliability of contact between the inner circumferential surface of the connection conductor 321 and the outer circumferential surface of the conductor adapter 330.

In this case, the contact band 330b may be formed of copper or aluminum, similar to the connection conductor 321. The contact band 330b fills a gap between the inner circumferential surface of the connection conductor 321 and the outer circumferential surface of the connection conductor 330, which are formed of different types of materials, and at the same time improves contact between the inner circumferential surface of the connection conductor 321 and the outer circumferential surface of the conductor adapter 330, thereby greatly increasing the reliability of conductivity.

Because aluminum is apt to corrode, the contact band 330b may be formed of a silver-plated metal or galvanized metal having high corrosion resistance and conductivity rather than aluminum to prevent corrosion and increase durability.

Figure 10:
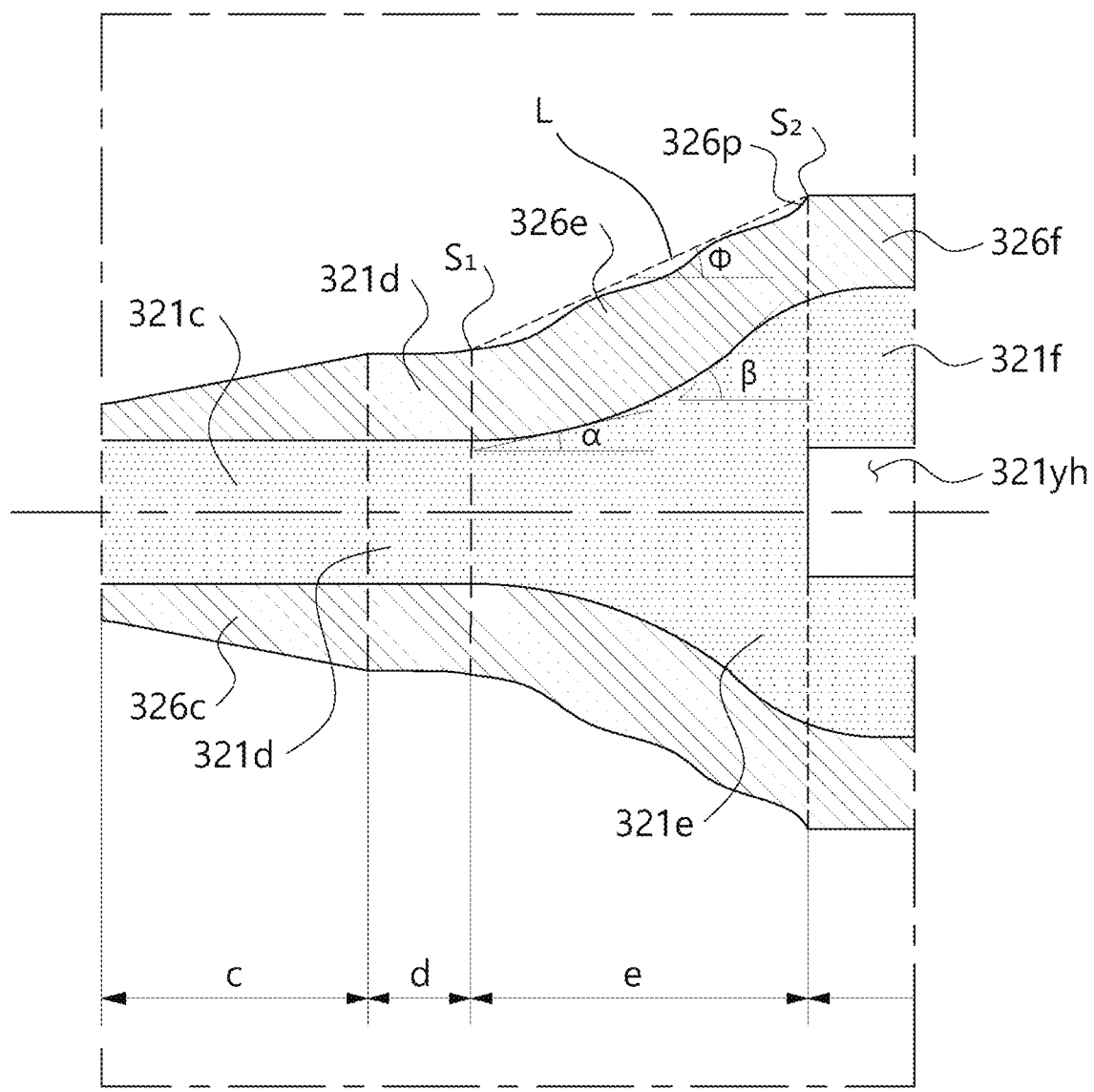
FIG. 10 is an enlarged view of an expanded diameter portion of a second conductor part of a connection sleeve according to another embodiment of the present disclosure.

FIG. 10 is an enlarged view of an expanded diameter portion of a second conductor part of a connection sleeve according to another embodiment of the present disclosure.

A different type power cable core connection device, for connection of a paper-insulated power cable core and an XLPE power cable core, according to the present disclosure illustrated in FIG. 10 includes a connection conductor 321 including a constant diameter portion, an expanded diameter portion, and a recessed portion, and an insulation molding part 326 surrounding the connection conductor 321, as in the embodiment of FIG. 6.

The embodiment of FIG. 10 is differentiated in that a third inclined portion 326e of the insulation molding part 326, which is most likely to crack due to a high slope of an insulated connection sleeve and is a weak point, is in a curved shape in the longitudinal direction rather than a straight shape.

A connection conductor of an insulated connection sleeve of FIG. 10 may include a constant diameter portion 321, an expanded diameter portion 321e having an expanded outer diameter of the constant diameter portion 321, and a recessed portion 321yh into which a conductor of the XLPE power cable core is inserted. A slope $\phi$ of a straight line L connecting a start point S1 and an end point S2 of the insulation molding part surrounding the expanded diameter portion 321e of the connection conductor in the longitudinal direction may be set to a value between a minimum slope $\alpha$ and a maximum slope $\beta$ of the outer circumferential surface of the expanded diameter portion 321e.

Similarly, in the embodiment of FIG. 10, even when a slope of the outer circumferential surface of the third inclined portion 326e, which is most likely to crack as a slope of the insulation molding part 326 increases and thus is a weak point, in the longitudinal direction is not constant and is in the form of a partially or entirely curved line or surface, damage, e.g., cracks, to the insulation molding part 326 due to heat generated when current is conducted to the connection conductor 321 was prevented when a slope $\phi$ of a straight line L connecting a start point S1 and an end point S2 of the third inclined portion 326e was a value between a minimum slope $\alpha$ and a maximum slope $\beta$ of the outer circumferential surface of the expanded diameter portion 321e of the second conductor part.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A different type power cable core connection device for connecting a paper-insulated power cable core and an XLPE power cable core, comprising an insulated connection sleeve including a connection conductor and an insulation molding part surrounding an outer circumference of the connection conductor, wherein a conductor of the paper-insulated power cable core is connected to one end of the connection conductor and a conductor of the XLPE power cable core is connected to the other end of the connection conductor, wherein the connection conductor comprises a constant diameter portion, an expanded diameter portion having an increased outer diameter of the constant diameter portion, and a recessed portion into which the conductor of the XLPE power cable core is inserted, and a slope at a point on an outer circumferential surface of the insulation molding part surrounding the expanded diameter portion in a longitudinal direction is a value between a minimum slope and a maximum slope of an outer circumferential surface of the expanded diameter portion.

2. The different type power cable core connection device of claim 1, wherein the insulation molding part comprises an inclined portion surrounding the expanded diameter portion, and a slope of an outer circumferential surface of the inclined portion in the longitudinal direction ranges from 10 to 30 degrees.

3. The different type power cable core connection device of claim 2, wherein the slope of the outer circumferential surface of the inclined portion in the longitudinal direction is constant.

4. The different type power cable core connection device of claim 1, wherein the insulation molding part comprises a plurality of inclined portions with different slopes, and at least some of the plurality of inclined portions are spaced apart from each other.

5. The different type power cable core connection device of claim 4, wherein the insulation molding part comprises two consecutive inclined portions in a direction from one end of the connection conductor to the other end thereof, a non-inclined horizontal portion behind the two consecutive inclined portions, and another inclined portion behind the horizontal portion.

6. The different type power cable core connection device of claim 5, further comprising a reinforcing insulating layer surrounding a portion of an insulating layer of the paper-insulated power cable core, an outer side of the connection conductor to which the conductor of the paper-insulated power cable core is connected, and at least a portion of the insulation molding part, wherein the reinforcing insulating layer overlaps only two inclined portions of the insulation molding part ahead of the horizontal portion.

7. The different type power cable core connection device of claim 4, wherein the plurality of inclined portions are provided in the direction from one end of the connection conductor to the other end thereof, and a non-inclined horizontal portion is provided between the plurality of inclined portions.

8. The different type power cable core connection device of claim 7, wherein three inclined portions are provided in the direction from one end of the connection conductor of the insulated connection sleeve to the other end thereof, and a non-inclined horizontal portion is provided between the three inclined portions.

9. The different type power cable core connection device of claim 1, wherein the connection conductor comprises: a first conductor part with a connection hole to which a conductor of the paper-insulated power cable core is connected; and a second conductor part bonded with the first conductor part and including the constant diameter portion, the recessed portion, and the expanded diameter portion.

10. The different type power cable core connection device of claim 9, wherein the insulation molding part surrounds an outer circumferential surface of the second conductor part, and the second conductor part is formed of the same material as a conductor having a coefficient of thermal expansion relatively close to a coefficient of thermal expansion of the insulation molding part among the conductor of the paper-insulated power cable core and the conductor of the XLPE power cable core.

11. The different type power cable core connection device of claim 9, further comprising:

a reinforcing insulating layer formed by winding insulating paper around a portion of an insulation layer of the paper-insulated power cable core, an outer side of the first conductor part, and at least a portion of the insulation molding part; and a stress relief cone mounted between the inside of the rear of the insulated connection sleeve and an outer circumferential surface of the XLPE power cable core.

12. The different type power cable core connection device of claim 11, further comprising an elastic support unit mounted behind the stress relief cone to elastically support the stress relief cone in a direction toward the insulated connecting sleeve.

13. The different type power cable core connection device of claim 9, wherein a thickness of the insulation molding part at an arbitrary point on the expanded diameter portion is in a range of 40% or more and 130% or less of a radius of the second conductor part.

14. The different type power cable core connection device of claim 1, further comprising a conductor adapter mounted to surround an end portion of a conductor of the XLPE power cable core and to be locked in the recessed portion of the insulated connecting sleeve, and at least one locking pin is provided on an outer circumferential surface of the conductor adapter, and a locking groove is provided on an inner circumferential surface of the recessed portion to cause the at least one locking pin to be stucked and fixed in the locking groove.

15. The different type power cable core connection device of claim 14, wherein the at least one locking pin is mounted on the conductor adapter while being elastically supported.

16. The different type power cable core connection device of claim 14, wherein both the conductor of the XLPE power cable core and the conductor adapter are formed of aluminum or copper.

17. The different type power cable core connection device of claim 14, further comprising a contact band formed of a metal and provided on an outer circumferential surface of the conductor adapter to increase contact between the outer circumferential surface of the conductor adapter and an inner circumferential surface of the recessed portion.

18. The different type power cable core connection device of claim 17, wherein the contact band is formed of a silver-plated material or a galvanized material.

19. A different type power cable core connection device for connecting a paper-insulated power cable core and an XLPE power cable core, comprising an insulated connection sleeve including a first conductor part with a connection hole, a second conductor part, and an insulation molding part surrounding an outer circumference of the second conductor part, wherein a conductor of the paper-insulated power cable core is connected to the connection hole, and a conductor of the XLPE power cable core is connected to the second conductor part, wherein the second conductor part comprises a constant diameter portion, an expanded diameter portion having an increased outer diameter of the constant diameter portion, and a recessed portion into which the conductor of the XLPE power cable core is inserted, and the second conductor part is formed of the same material as a conductor having a coefficient of thermal expansion relatively close to a coefficient of thermal expansion of the insulation molding part among the conductor of the paper-insulated power cable core and the conductor of the XLPE power cable core.

20. A different type power cable core connection device for connecting a paper-insulated power cable core and an XLPE power cable core, comprising an insulated connection sleeve including a connection conductor and an insulation molding part surrounding an outer circumference of the connection conductor, wherein a conductor of the paper-insulated power cable core is connected to one end of the connection conductor and a conductor of the XLPE power cable core is connected to the other end thereof, wherein the connection conductor comprises a constant diameter portion, an expanded diameter portion having an increased outer diameter of the constant diameter portion, and a recessed portion into which the conductor of the XLPE power cable core is inserted, and a slope at a point on an outer circumferential surface of the insulation molding part in a longitudinal direction gradually increases to 30 degrees or less in a direction toward the other end of the connection conductor.

\* \* \* \* \*